March 8, 1966 D. A. YOUNG 3,239,451
HYDROCRACKING PROCESS WITH A CRYSTALLINE ZEOLITE CATALYST
COMPOSITE ACTIVATED WITH HYDROGEN SULFIDE
Filed April 30, 1963
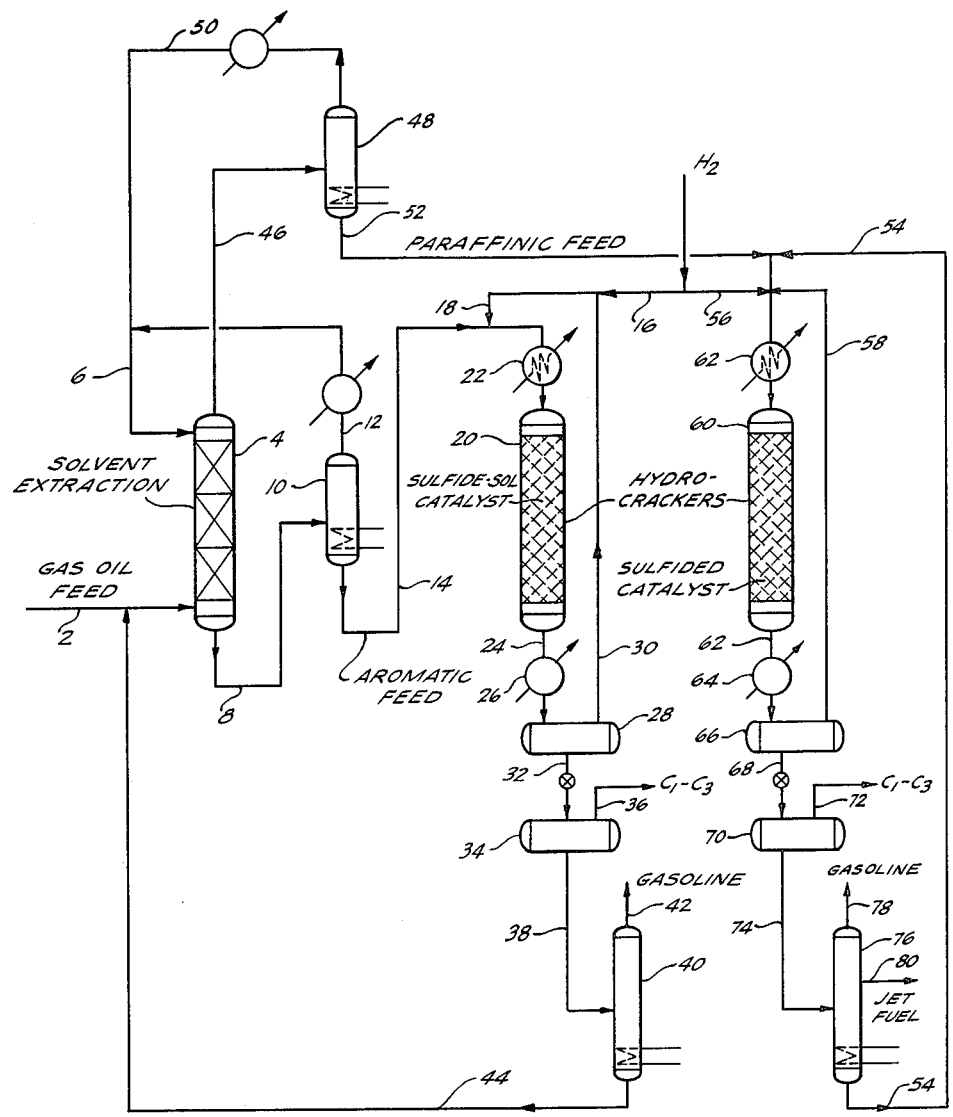
INVENTOR.
DEAN ARTHUR YOUNG
BY
*Lannas S. Henderson*
ATTORNEY 3,239,451
HYDROCRACKING PROCESS WITH A CRYSTAL-
LINE ZEOLITE CATALYST COMPOSITE ACTI-
VATED WITH HYDROGEN SULFIDE
Dean Arthur Young, Yorba Linda, Calif., assignor to
Union Oil Company of California, Los Angeles, Calif.,
a corporation of California
Filed Apr. 30, 1963, Ser. No. 276,721
12 Claims. (Cl. 208—111)

This invention relates to the catalytic hydrocracking of hydrocarbons to produce therefrom lower boiling hydrocarbons, boiling for example in the gasoline range. The invention is particularly directed to the provision of certain novel hydrocracking catalysts which have been presulfided in such manner as to improve their hydrocracking activity, and particularly their specific activity for hydrocracking paraffinic hydrocarbons.

Briefly, the new hydrocracking catalysts of this invention comprise a crystalline, zeolitic, molecular sieve cracking base containing a small proportion of a Group VIII metal hydrogenating component originally added by ion-exchange, said catalyst having been presulfided at low temperatures with hydrogen sulfide. It has been found that the presulfiding technique brings about a substantial improvement in hydrocracking activity, particularly paraffin hydrocracking activity. It has further been found that the beneficial effects of presulfiding can be enhanced if carried out under substantially anhydrous conditions, and still further if the sulfiding treatment is applied to an ammonium form of the zeolite catalyst. This ammonium form is then later converted, as by calcining or high-temperature reduction, to a "decationized" or hydrogen form of the zeolite. The resulting presulfided and reduced hydrogen zeolite catalysts are then ready for use in hydrocracking.

In my copending application, Serial No. 218,101, filed August 20, 1962, I have shown that zeolitic hydrocracking catalysts can be improved in activity for hydrocracking aromatic hydrocarbons by initially incorporating the Group VIII hydrogenating metal in the form of a hydrous colloidal sulfide, e.g., by impregnation of the zeolitic base with a hydrosol of palladium sulfide. These sulfide-sol catalysts are not, however, substantially improved in paraffin hydrocracking activity. Accordingly, one aspect of the present invention is directed toward the provision of a dual-catalyst hydrocracking system, wherein a mixed hydrocarbon feed is first separated into a paraffinic fraction and an aromatic fraction, the latter being subjected to hydrocracking in contact with the sulfide-sol impregnated catalysts, and the paraffinic fraction being hydrocracked over the ion-exchanged and sulfided catalysts of this invention. By operating in this manner, each type of catalyst is utilized to its maximum efficiency.

It has recently been discovered that certain zeolitic molecular sieve compositions, e.g., those of the "Y" crystal type, constitute excellent hydrocracking catalysts when compounded by ion-exchange with Group VIII metal hydrogenation catalysts such as palladium. Ion exchange is normally effected by digesting the zeolite, either in its sodium or ammonium form, with a suitable salt of the hydrogenating metal wherein the metal appears in the cation. The ion-exchanged composite is then dried and preferably reduced with hydrogen, thus activating the catalyst. In theory, the resulting catalysts should contain the hydrogenating metal in the ultimate of homogeneous dispersion, i.e., in substantially mono-atomic distribution. It came as a distinct surprise to find that these catalysts do not in fact display the maximum possible activity for hydrocracking, but that a substantial increase in activity is obtained by the presulfiding technique. The reason for this improvement is not clearly understood, but apparently the presulfiding either renders some of the latent cracking sites more accessible to paraffinic hydrocarbons, and/or there may be brought about a more optimum distribution of the Group VIII metal with respect to active cracking sites. Still another possibility is that the presulfiding merely stabilizes the active centers against unfavorable changes occurring during subsequent activation of the catalyst by hydrogen reduction.

The catalysts of this invention are particularly effective for the hydrocracking of mineral oil feedstocks which contain substantial proportions of paraffinic hydrocarbons. Where the feedstock is wholly aromatic in nature, they are not markedly superior, but a substantial overall increase in conversion efficiency is observed where the feedstock contains both aromatic and paraffinic hydrocarbons. The maximum in catalyst efficiency is obtained however when such mixed feeds are first separated into an aromatic portion and a paraffinic portion, and the portions separately hydrocracked as above-described.

The molecular sieve cracking bases of this invention are partially dehydrated, zeolitic crystalline compositions composed usually of silica, alumina, and one or more exchangeable cations such as sodium, hydrogen, magnesium, calcium, etc. They are further characterized by crystal pores of relatively uniform diameter between about 6 and 14 A. Several crystal forms of such molecular sieves are now available and suitable for use herein, e.g., those of the "X," "Y" or "L" crystal types, or synthetic mordenite. It is preferred to employ molecular sieves having a relatively high $SiO_2/Al_2O_3$ mole-ratio, between about 2.5 and 10, preferably between about 3 and 8. In particular, the Y molecular sieves having crystal pore diameters of about 9 to 10 A, and wherein the $SiO_2/Al_2O_3$ ratio is about 4–6, are preferred, either in their hydrogen form, or a divalent metal form, preferably magnesium. The most active hydrocracking bases are those wherein the exchangeable zeolitic cations are hydrogen and/or a divalent metal such as magnesium, calcium or zinc.

Normally, these molecular sieves are prepared first in the sodium or potassium form, but it is preferred that most or all of the monovalent metal be ion exchanged out with a divalent metal, or where a hydrogen form is desired, with an ammonium salt followed by heating to decompose the zeolitic ammonium ion and leave a hydrogen ion. In some cases, as in the case of synthetic mordenite, the hydrogen forms can be prepared by direct acid treatment of the alkali metal sieves. These hydrogen sieves are sometimes referred to as being "decationized." Y sieve zeolites of this nature are more particularly described in Belgian Patents Nos. 598,582, 598,682, 598,683 and 598,686.

The essential active metals employed herein as hydrogenation components are those of Group VIII, i.e., iron, cobalt, nickel, ruthenium, rhodium, palladium, osmium, iridium and platinum, or mixtures thereof. The noble metals are preferred, and particularly palladium and platinum. In addition to these metals, other promoters may also be employed in conjunction therewith, including the metals of Groups VIB and VIIB, e.g., molybdenum, chromium, manganese, etc.

The amount of hydrogenating metal in the catalyst can vary within wide ranges. Broadly speaking, any amount between about 0.1 and 20% by weight may be used. In the case of the noble metals, it is normally preferred to use about 0.2 to 2% by weight. The preferred method of adding the hydrogenating metal is by ion exchange. This is accomplished by digesting the zeolite, preferably in its ammonium form, with an aqueous solution of a suitable compound of the desired metal wherein the metal is present in a cationic form, and then reducing to form the free metal, as described for example in Belgian Patent No. 598,686.

If desired, the sulfiding operation may be carried out by simply bubbling hydrogen sulfide through the aqueous slurry resulting from the ion-exchange of Group VIII metal onto the catalyst. But for best results, it is preferred to condition the ion-exchanged catalyst for the sulfiding pretreatment by subjecting it to a substantial dehydration to reduce the water content to a level which is at least below the adsorption capacity of the catalyst, and preferably below about 10% by weight. The zeolite catalysts of this invention are strong adsorbents for water, and are generally capable of holding about 25–30% by weight of adsorbed water at atmospheric temperatures and pressures.

To reduce the water content of the catalysts to below about 30% by weight, either of two general procedures may be used. Firstly, the freshly exchanged catalyst, in its ammonium form, may be dried at relatively low temperatures, e.g., below about 300° F., in a dry stream of gas until the water content is reduced to, e.g., about 5–25% by weight. By this procedure the zeolitic ammonium content is not decomposed, and a sensibly dry form of the ammonium zeolite is obtained. Alternatively, the dehydration may be carried out at higher temperatures, up to about 700–1000° F., in which case the ammonium ion is decomposed leaving a hydrogen form of the zeolite, while at the same time the water content can be reduced to below about 5% by weight. Either of these dehydrated forms may be subjected to presulfiding as described herein, but as previously noted, superior results are normally obtained when the ammonium form is presulfided. In those cases where a finished catalyst has already been obtained (i.e., one which has been previously heated to form the hydrogen zeolite), it may be reammoniated with dry ammonia gas at, e.g., 50–300° F. prior to sulfiding, and then reactivated by hydrogen reduction at, e.g., 600–900° F.

The sulfiding treatment of this invention is preferably, though not necessarily, carried out as a catalyst pretreatment procedure after the catalyst is placed in the hydrocracking reactor. Sulfiding is carried out by passing through the catalyst bed gaseous mixtures comprising hydrogen sulfide, or other readily decomposable organic sulfur compound, preferably in admixture with hydrogen, nitrogen or other inert gas. The treatment is continued for a sufficient time to bring about complete sulfiding of the hydrogenating metal on the catalyst, normally about 30 minutes to 8 hours. Temperature is a critical factor during sulfiding. In general, temperatures below about 400° F., and preferably below 200° F., should be maintained, at least for the initial portion of the sulfiding operation. It has been found that where the sulfiding is carried out exclusively at high temperatures, e.g., above about 500° F., the finished catalyst has a substantially lower paraffin hydrocracking activity. It has also been observed that high pressures are detrimental during sulfiding, and it is hence preferred to utilize pressures of about 0 to 100 p.s.i.g. The combination of high temperatures and high pressures during sulfiding is most highly detrimental and should be avoided.

A typical presulfiding operation is carried out by passing a 1/1 mixture of hydrogen and hydrogen sulfide over the catalyst at room temperature and atmospheric pressure at the rate of about 40 s.c.f. per hour per volume of catalyst for about 2 to 6 hours.

Following the presulfiding treatment, it is normally desirable to subject the catalyst to a high-temperature reduction with hydrogen before contacting the hydrocarbon feedstock. Reduction may be accomplished at, e.g., 600–1000° F. with a flowing stream of hydrogen, either at atmospheric or elevated pressures. If the catalyst still contains water prior to the reduction treatment, it is preferable to raise the temperature gradually in a hydrogen stream, and to maintain low pressures, e.g., atmospheric, until substantially all water is expelled from the catalyst, after which the pressure may be raised. The high temperature reduction treatment is essential in those cases where the catalyst has been sulfided in the ammonium form. The hydrogen reduction at high temperatures converts the zeolitic ammonium ions to hydrogen ions, and also removes sulfur from the catalyst. In some cases, it may be found difficult to remove all ammonia and sulfur, and in these cases it may be desirable to subject the catalyst to an oxidation treatment at, e.g., 600–1000° F., and then again reduce with hydrogen.

The pretreated catalysts of this invention may be employed for the hydrocracking of substantially any mineral oil fraction boiling above the gasoline range, i.e., above about 300° F., and usually above about 400° F., and having an end-boiling-point up to about 1000° F., but preferably not greater than about 850° F. These feedstocks may contain up to about 5% by weight of sulfur, and they may also contain organic nitrogen compounds. The presulfiding technique is of greatest benefit however, for hydrocracking in a sulfur-free system; this entails the use of feedstocks substantially free of sulfur, i.e., containing less than 0.1% by weight of sulfur. Specific feedstocks contemplated comprise straight-run gas oils and heavy naphthas, coker distillate gas oils and heavy naphthas, deasphalted crude oils, cycle oils derived from catalytic or thermal cracking operations and the like. Specifically, it is preferred to employ oils having an API gravity between about 25 and 35°, and containing at least about 20% by volume of paraffinic hydrocarbons.

Hydrocracking conditions to be employed herein fall within the following ranges:

| | Operative | Preferred |
|---|---|---|
| Temperature, °F | 400–850 | 500–750 |
| Pressure, p.s.i.g | 400–5,000 | 750–2,000 |
| H₂/oil ratio, s.c.f./b | 1,000–15,000 | 2,000–10,000 |
| LHSV, v./v./hr | 0.1–10 | 0.5–5 |

Depending upon the severity of the hydrocracking conditions, and the refractoriness of the feed, it will be observed that the activity of the catalyst will have declined considerably after a period of time ranging between a few hours to several months. When the activity has declined to an undesirable level, the flow of feedstock is terminated, and the catalyst is regenerated by combustion at, e.g., 400–1000° F., according to conventional regeneration procedures.

Following regeneration, it is normally desirable to subject the regenerated catalyst again to the sulfiding pretreatment before contacting feedstock.

Reference is now made to the accompanying drawing, which is a flowsheet illustrating one modification of a split-feed, dual-catalyst hydrocracking process. The initial feedstock, consisting for example of a straight-run gas oil boiling between about 400–800° F., is brought in via line 2 and separated into a relatively aromatic and a relatively non-aromatic fraction in solvent extraction column 4. Any conventional method of separating aromatics from non-aromatic hydrocarbons may be employed, as for example azeotropic distillation, selective adsorption, extractive distillation and the like. However, in the modification illustrated, the feedstock is introduced into the bottom of countercurrent extraction column 4, which is preferably packed with a suitable material such as Raschig rings or the like to facilitate contact between liquids. The solvent employed for the extraction may comprise any of the well known polar compounds which exhibit a selective solvency for aromatic hydrocarbons as opposed to non-aromatic hydrocarbons, and which are suitably low-boiling. Suitable solvents include for example ethanol, methanol, phenol, furfural, ethylene glycol monomethyl ether, acetonitrile, sulfur dioxide and the like.

The solvent is admitted to the top of column 4 via line 6 and passes downwardly, countercurrently to the rising hydrocarbon stream. The aromatic extract is withdrawn at the bottom of the column via line 8, and transferred to a small fractionating column 10, from which the volatile solvent is removed as overhead via line 12, condensed and recycled to the top of extraction column 4. The stripped aromatic extract is withdrawn from the bottom of the column via line 14, mixed with recycle and fresh hydrogen from lines 16 and 18, and passed into aromatic hydrocracking unit 20 via preheater 22. This aromatic fraction is composed mainly of polycyclic aromatic hydrocarbons, a smaller proportion of higher alkyl benzenes, and in some cases will contain organic nitrogen and/or sulfur compounds which were present in the feed, and which generally are selectively extracted along with the aromatic hydrocarbons in extraction column 4. The feed-hydrogen mixture passes downwardly through hydrocracker 20 in contact with the aromatic-selective, sulfide-sol catalyst under contacting conditions within the following general ranges:

AROMATIC HYDROCRACKING CONDITIONS

|  | Operative | Preferred |
| --- | --- | --- |
| Temperature, ° F | 400–850 | 450–700 |
| Pressure, p.s.i.g | 400–3,000 | 800–2,000 |
| LHSV, v./v./hr | 0.5–15 | 1–10 |
| H₂/oil ratio, s.c.f./b | 500–20,000 | 2,000–12,000 |

Normally it is preferred to adjust the hydrocracking conditions so as to obtain about 20–70 volume-percent conversion per pass to desired product.

The aromatic-selective catalyst in reactor 20 may be prepared by any of the methods described in the above-noted application, Serial No. 218,101. In general, such catalysts are prepared by impregnating one of the zeolitic molecular sieve cracking bases of this invention with a colloidal metal sulfide hydrosol of the desired hydrogenating metal, e.g., palladium sulfide. Preferably the zeolite is impregnated in its ammonium form, followed by drying and calcining to produce a hydrogen zeolite. It is further preferred that a portion of the hydrogenating metal be added to the zeolite base by ion-exchange, as in the case of the paraffin-selective catalysts of this invention, and another portion of the palladium added to the ion-exchanged catalyst by impregnation with a sulfide sol. The catalysts containing both ion-exchanged hydrogenating metal and sulfide-sol-composited metal, are more active than analogous catalysts containing the same amount of hydrogenating metal in ion-exchanged form, or wholly in sulfide sol impregnated form. The critical feature for obtaining high aromatic hydrocracking activity appears to be that at least a portion of the hydrogenating metal be compounded with the cracking base in the form of a colloidal hydrous sulfide which is later reduced to the free metal by hydrogen reduction.

The hydrocracked effluent from reactor 20 is withdrawn via line 24, condensed in cooling unit 26, and passed into high-pressure separator 28, from which recycle hydrogen is withdrawn via line 30 and recycled as previously described. The liquid condensate in separator 28 is then flashed via line 32 into low-pressure separator 34, from which light hydrocarbon gases are exhausted via line 36. The low-pressure condensate in separator 34 is then transferred via line 38 to fractionating column 40, from which desired product such as gasoline is taken overhead via line 42. The bottoms from column 40, normally comprising mixed paraffinic and aromatic hydrocarbons boiling above about 400° F., is withdrawn as bottoms via line 44, and preferably recycled to the initial feed line 2 for further separation into aromatic and paraffinic components for recycle. In some cases, it may be found that the unconverted oil from fractionating column 40 will be sufficiently aromatic to be recycled directly to hydrocracker 20, while in still other instances it may be sufficiently hydrogenated to be usable directly in the paraffinic hydrocracking unit to be subsequently described.

The raffinate from extraction column 4, comprising mainly non-aromatic hydrocarbons containing a small amount of dissolved solvent, is withdrawn via line 46 and sent to raffinate stripping column 48, from which solvent is recovered overhead via line 50 and recycled to line 6 for reuse in extraction column 4. The bottoms from stripping column 48 is withdrawn via line 52, mixed with paraffinic recycle oil from line 54, and with fresh and recycle hydrogen from lines 56 and 58, and the mixture is then passed into paraffin hydrocracking unit 60 via preheater 62. Feed plus hydrogen passes downwardly in hydrocracker 60 in contact with ion-exchanged and pre-sulfided catalyst of this invention, and subjected to hydrocracking therein under the following general conditions:

PARAFFIN HYDROCRACKING CONDITIONS

|  | Operative | Preferred |
| --- | --- | --- |
| Temperature, ° F | 400–850 | 450–700 |
| Pressure, p.s.i.g | 100–3,000 | 500–2,000 |
| LHSV, v./v./hr | 0.5–15 | 1–10 |
| H₂/oil ratio, s.c.f./b | 200–15,000 | 500–10,000 |

The above conditions are suitably correlated with the objective of providing about 20–70 volume-percent conversion per pass to desired products.

The effluent from hydrocracker 60 is withdrawn via line 62, condensed in cooling unit 64, and passed into high-pressure separator 66, from which recycle hydrogen is withdrawn via line 58 as previously described. The liquid condensate in separator 66 is then transferred via line 68 into low-pressure separator 70, from which light hydrocarbon gases are exhausted via line 72. The low-pressure condensate in separator 70 is then transferred via line 74 to fractionating column 76, from which desired products such as gasoline and/or jet fuel are recovered via lines 78 and 80 respectively. The unconverted oil boiling above the desired product ranges is withdrawn as bottoms via line 54 and recycled as previously described. Alternatively, this paraffinic bottoms fraction may be utilized in other products such as diesel fuels or the like.

It is not intended that the invention be limited to the details described above. In particular, it is contemplated in cases where the aromatic feed extract in line 14 contains substantial quantities of organic nitrogen compounds, that the upper portion of hydrocracking catalyst in reactor 20 can be replaced with a suitable non-cracking hydrofining catalyst such as the oxides and/or sulfides of cobalt, molybdenum, tungsten, nickel and the like supported on a substantially neutral carrier such as activated alumina. Such an "integral" hydrofining operation serves to convert organic nitrogen and/or sulfur compounds to less troublesome and more volatile impurities such as ammonia and hydrogen sulfide, which do not repress catalytic cracking activity to the same extent as the original organic impurities. Such a hydrofining operation can be carried out under the same general conditions outlined above for the hydrocracking of the aromatic feedstock.

According to another contemplated modification of the invention, the initial solvent extraction in column 4 may be so controlled, as by reducing the solvent/oil ratio, as to bring about a substantial separation between polycyclic aromatic hydrocarbons and monocyclic aromatic hydrocarbons, the latter being recovered along with the raffinate in line 46. In this manner, the monocyclic aromatics, or at least a substantial portion thereof, are allowed to go to hydrocracking unit 60, in admixture with the paraffinic feed. The presence of the monocyclic aromatic hydrocarbons improves the efficiency of paraffin hydrocracking, as described in my copending application, Serial No. 182,263, filed March 26, 1962.

In the solvent extraction method illustrated, it will normally be found that most of the naphthenes which may have been present in the feed will be recovered along with the paraffins in line 52. It is preferred, though not essential, to include the naphthenic hydrocarbons mainly in the paraffinic feed fraction.

Pressure, 1,000 p.s.i.g.; LHSV, 8.0; hydrogen/oil ratio, 20,000 s.c.f./b; temperature, 550–551° F. The results of the various runs after 3–4 hours on-stream were as follows:

TABLE 1

| Run No. | 1 | 2 | 3 | 4 | 5 | 6 |
|---|---|---|---|---|---|---|
| Catalyst | A | B | C | D | E | F |
| Sulfiding Method | None | Pd-H-Zeolite [1] | Pd-H-Zeolite [2] | Pd-NH$_4$-Zeolite [3] | Pd-NH$_4$-Zeolite [4] | Pd-NH$_4$-Zeolite [5] |
| Product Gravity, °API | 57.8 | 58.0 | 66.5 | 67.7 | 65.8 | 82.3 |
| Vol.-percent C$_3$-C$_9$ Hydrocarbons in Product | 9.5 | 6.3 | 44.2 | 48.1 | 38.6 | 91.1 |
| Iso/Normal Paraffin Ratios in Product: | | | | | | |
| C$_4$ | 1.6 | 1.2 | 1.7 | 1.8 | 1.8 | 1.9 |
| C$_5$ | 2.2 | 2.2 | 3.3 | 3.3 | 3.6 | 4.1 |
| C$_6$ | 2.7 | 2.4 | 3.6 | 3.4 | 3.6 | 3.7 |

[1] Sulfided dry at 500° F.
[2] Sulfided dry at room temp.
[3] Sulfided in aqueous slurry at room temp.
[4] Hydrated (27% H$_2$O) and sulfided at room temp.
[5] Sulfided dry (7–8% H$_2$O) at room temp.

The following examples are cited to demonstrate the critical effects of the novel features of this invention, but are not to be construed as limiting in scope:

*Example I*

A molecular sieve cracking base of the Y crystal type, having a SiO$_1$/Al$_2$O$_3$ mole-ratio of about 4.7, in its hydrated ammonium form, was used to prepare six different Pd-containing catalysts, as follows:

Catalyst A (unsulfided) was prepared in the conventional manner by exchanging the ammonium zeolite with tetraminepalladium chloride to add 0.5% by weight of palladium. The Pd-containing ammonium zeolite was then drained, dried, pelleted and calcined to expel the ammonia and form the catalytically active hydrogen zeolite.

Catalyst B was prepared by reammoniating a portion of catalyst A at room temperature with 1/1 nitrogen-ammonia mixture, reducing in hydrogen for 2 hours at 850° F. in order to reduce the water content to below about 5% by weight and re-form the hydrogen zeolite, which was then sulfided in the dry state for 1 hour at 500° F. using a 1/1 hydrogen-hydrogen sulfide mixture. The sulfided catalyst was then reduced for 8 hours at 850° F., and oxidized at 850° F. in oxygen.

Catalyst C was prepared in the same manner as catalyst B, except that the sulfiding was carried out at room temperature instead of 500° F.

Catalyst D was prepared by reammoniating a portion of catalyst A with a 1/1 nitrogen-ammonia mixture, and then slurrying the powdered catalyst in water saturated with hydrogen sulfide for 2 hours, after which the slurry was heated to boiling, filtered, dried, and the powdered filter cake pelleted. The final pellets were reduced and oxidized as before.

Catalyst E was prepared by reammoniating a portion of catalyst A as before, purging with nitrogen at about 110° C. to remove excess ammonia and reduce the water content, then hydrating the ammonium zeolite catalyst with water-saturated air to bring the water content up to about 27% by weight, after which the hydrated catalyst was sulfided with a 1/1 hydrogen-hydrogen sulfide mixture at room temperature, followed by pelleting, reducing and oxidizing as before.

Catalyst F was prepared in the same manner as catalyst E, except that the hydration step was omitted, the sulfiding being performed on the relatively dry ammonium zeolite catalyst containing about 7–8% by weight of water.

Each of the foregoing catalysts was then tested for paraffin hydrocracking activity, using n-dodecane (56.4° API) as feed. The hydrocracking conditions were:

The foregoing data clearly demonstrate that sulfiding at relatively low temperatures is essential to obtain the desired improvement in activity. It also shows the synergistic effect of ammoniating the catalyst prior to sulfiding, and a comparison of Runs 4, 5 and 6 shows that this synergistic effect is further enhanced by reducing the water content of the zeolite. Finally, the data shows that a substantial improvement in iso/normal paraffin ratios is obtained by the low temperature sulfiding treatment.

*Example II*

To test the effects of catalyst presulfiding on the hydrocracking of a mixed paraffinic-aromatic feedstock, two additional catalysts were prepared as follows:

Catalyst G was prepared by reammoniating a portion of catalyst A, adding another 0.5% by weight of palladium (1% palladium total) by ion-exchange with a solution of tetramine palladium nitrate. The exchanged catalyst was dried, pelleted and converted to the hydrogen form by reducing at 875° F. for 48 hours, and then oxidizing 4 hours at 800° F.

Catalyst H was prepared in the same manner as catalyst G, except that, following the addition of the second 0.5% of palladium, the wet exchange slurry was saturated with hydrogen sulfide, followed by evaporation of the slurry to dryness, pelleting and activating as previously described. Each of the foregoing catalysts was then compared for hydrocracking activity using as feedstock a hydrofined gas oil boiling between about 390° and 820° F., having an API gravity of 34°, and containing about 25% by volume aromatics and 74% saturated hydrocarbons. Hydrocracking was carried out at 700–701° F., 1,000 p.s.i.g., 8 LHSV and using 20,000 s.c.f./b. of hydrogen. The results were as follows:

TABLE 2

| Run No. | 7 | 8 |
|---|---|---|
| Catalyst | G | H |
| Sulfiding Method | None | Pd-NH$_4$-Zeolite [1] |
| Product Gravity, °API | 42.4 | 45.7 |
| Conversion (Vol.-Percent) to: | | |
| 0–360° F. | 24.7 | 34.3 |
| 360–500° F. | 25.2 | 25.7 |
| 500+° F. Botts. | 48.2 | 38.9 |
| Iso/Normal Paraffin Ratios in Product: | | |
| C$_4$ | 1.2 | 1.3 |
| C$_5$ | 6.6 | 9.7 |
| C$_6$ | 7.2 | 11.8 |

[1] Sulfided in aqueous slurry at room temperature.

The higher activity of the sulfided catalyst is readily apparent, particularly its selective activity for converting the heavy ends of the feed. Here again the sulfided catalyst gave higher iso/normal paraffin ratios.

*Example III*

This example demonstrates the substantially opposite results obtained when, instead of adding the palladium by ion-exchange before sulfiding, a portion thereof is added by impregnation with a palladium sulfide hydrosol. A portion of catalyst substantially identical to catalyst A above (0.5% palladium) was reammoniated and impregnated with an additional 0.5% by weight of palladium by immersing in a palladium sulfide hydrosol prepared by bubbling $H_2S$ through a 0.89% aqueous solution of ammonium tetrachloro palladate. The impregnated catalyst was drained, dried, pelleted, reduced in a stream of hydrogen for 16 hours at 850° F. and then calcined in air at 850° F. for 16 hours (Catalyst J). This catalyst was then compared in hydrocracking activity with a non-sulfided Catalyst (K) prepared by adding the second 0.5% palladium by ion-exchange, using both n-dodecane and tetralin as feedstocks. The results were as follows:

TABLE 3

| Run No. | 9 | 10 | 11 | 12 |
|---|---|---|---|---|
| Catalyst | J | K | J | K |
| Sulfiding Method | PdS sol | None | PdS sol | None |
| Feed | $n\text{-}C_{12}$ | $n\text{-}C_{12}$ | Tetralin | Tetralin |
| Product Gravity, °API | 58.3 | 61.3 | 46.7 | 21.7 |
| Vol.-Percent: | | | | |
| $C_3\text{-}C_6$ product | | | 12.8 | 1.6 |
| $C_3\text{-}C_9$ product | 9.0 | 25.8 | | |

It is readily apparent that adding the palladium as a sulfide hydrosol does not improve the paraffin hydrocracking activity, but does effect a substantial improvement in aromatic hydrocracking activity.

Substantially similar differential results are obtained when other hydrocracking catalysts and feedstocks within the purview of this invention are substituted in the foregoing examples. It is therefore not intended that the invention should be limited to the details of the examples but broadly as defined in the following claims:

I claim:

1. A method for increasing the activity of a hydrocracking catalyst, said catalyst comprising a crystalline, zeolitic, alumino-silicate molecular sieve cracking base combined by ion exchange with a minor proportion of a Group VIII metal hydrogenating promoter, which comprises subjecting said catalyst to a presulfiding treatment by contacting the same with hydrogen sulfide at a temperature which, for at least the initial portion of said contacting, is below about 200° F., and then reducing the sulfided catalyst with hydrogen.

2. A method as defined in claim 1 wherein said presulfiding is carried out under substantially anhydrous conditions, and wherein the catalyst contains less than about 10% by weight of water when subjected thereto.

3. A method as defined in claim 1 wherein said presulfiding treatment is carried out at a pressure below about 100 p.s.i.g., and under substantially anhydrous conditions, and wherein the catalyst contains less than about 10% by weight of water when subjected thereto.

4. A process as defined in claim 1 wherein said catalyst, when subjected to said presulfiding treatment, is a hydrogen zeolite of the Y crystal type combined by ion exchange with a palladium metal hydrogenating promoter.

5. A catalyst composition comprising a zeolitic, alumino-silicate molecular sieve cracking base of the Y crystal type combined by ion exchange with a small proportion of a Group VIII metal hydrogenating promoter, the zeolitic cation content of said cracking base comprising mainly hydrogen ions, said catalyst having been presulfided with hydrogen sulfide and reduced in hydrogen as defined in claim 1.

6. A process for hydrocracking a hydrocarbon feedstock which comprises subjecting said feedstock plus added hydrogen to hydrocracking conditions of temperature and pressure in contact with a catalyst comprising a zeolitic, alumino-silicate molecular sieve cracking base of the Y crystal type combined by ion exchange with a small proportion of a Group VIII metal hydrogenating promoter, the zeolitic cation content of said cracking base comprising a substantial proportion of hydrogen ions, said catalyst having been prepared by ion-exchanging said Group VIII metal into an ammonium form of said zeolitic cracking base, followed by (a) reducing in hydrogen at an elevated temperature to convert zeolitic ammonium ions to hydrogen ions, and then (b) sulfiding of the resulting hydrogen zeolite composition by contacting the same with hydrogen sulfide at a temperature which, at least for the initial portion of said sulfiding, is below about 200° F.

7. A process as defined in claim 6 wherein said sulfiding step (b) is carried out at a pressure below about 100 p.s.i.g., and under substantially anhydrous conditions, and wherein the catalyst contains less than about 10% by weight of water when subjected thereto.

8. A process as defined in claim 6 wherein said Group VIII metal is a noble metal.

9. A process as defined in claim 6 wherein said Group VIII metal is palladium.

10. A process as defined in claim 6 wherein said hydrocarbon feedstock comprises a substantial proportion of paraffinic hydrocarbons, and is substantially sulfur-free.

11. A process for hydrocracking a hydrocarbon feedstock containing both paraffinic and aromatic hydrocarbons, which comprises:
(A) subjecting said feedstock to a hydrocarbon separation step, and recovering therefrom a relatively aromatic feed fraction and a relatively paraffinic feed fraction;
(B) subjecting said aromatic feed fraction plus added hydrogen to catalytic hydrocracking in contact with a catalyst comprising a crystalline, zeolitic alumino-silicate molecular sieve cracking base and a small proportion of a Group VIII metal hydrogenating component originally incorporated into said catalyst by impregnation with a sulfide hydrosol of said metal;
(C) subjecting said paraffinic feed fraction plus added hydrogen to catalytic hydrocracking in contact with a catalyst comprising a crystalline, zeolitic alumino-silicate molecular sieve cracking base and a small proportion of a Group VIII metal hydrogenating component originally incorporated into said catalyst by ion-exchange from an aqueous solution of a salt of said metal wherein the metal appears in the cation, followed by sulfiding of the ion-exchanged composite with hydrogen sulfide at a temperature below about 200° F.; and
(D) recovering desired low-boiling hydrocarbons from each of steps (B) and (C).

12. A process as defined in claim 11 wherein, in the case of each of said catalysts used in steps (B) and (C), the said molecular sieve cracking base is of the Y crystal type, and the said Group VIII metal hydrogenating component is palladium.

(References on following page)

References Cited by the Examiner

UNITED STATES PATENTS

| | | | |
|---|---|---|---|
| 2,627,495 | 2/1953 | Lanning | 208—87 |
| 2,971,904 | 2/1961 | Gladrow et al. | 208—135 |
| 2,983,670 | 5/1961 | Seubold | 208—110 |
| 3,032,495 | 5/1962 | Drews | 208—95 |
| 3,072,560 | 1/1963 | Paterson | 208—111 |
| 3,119,763 | 1/1964 | Haas et al. | 208—110 |
| 3,132,087 | 5/1964 | Kelly et al. | 208—59 |
| 3,140,252 | 7/1964 | Frilette et al. | 208—120 |

DELBERT E. GANTZ, *Primary Examiner.*

ALPHONSO D. SULLIVAN, *Examiner.*